2 Sheets—Sheet 2.

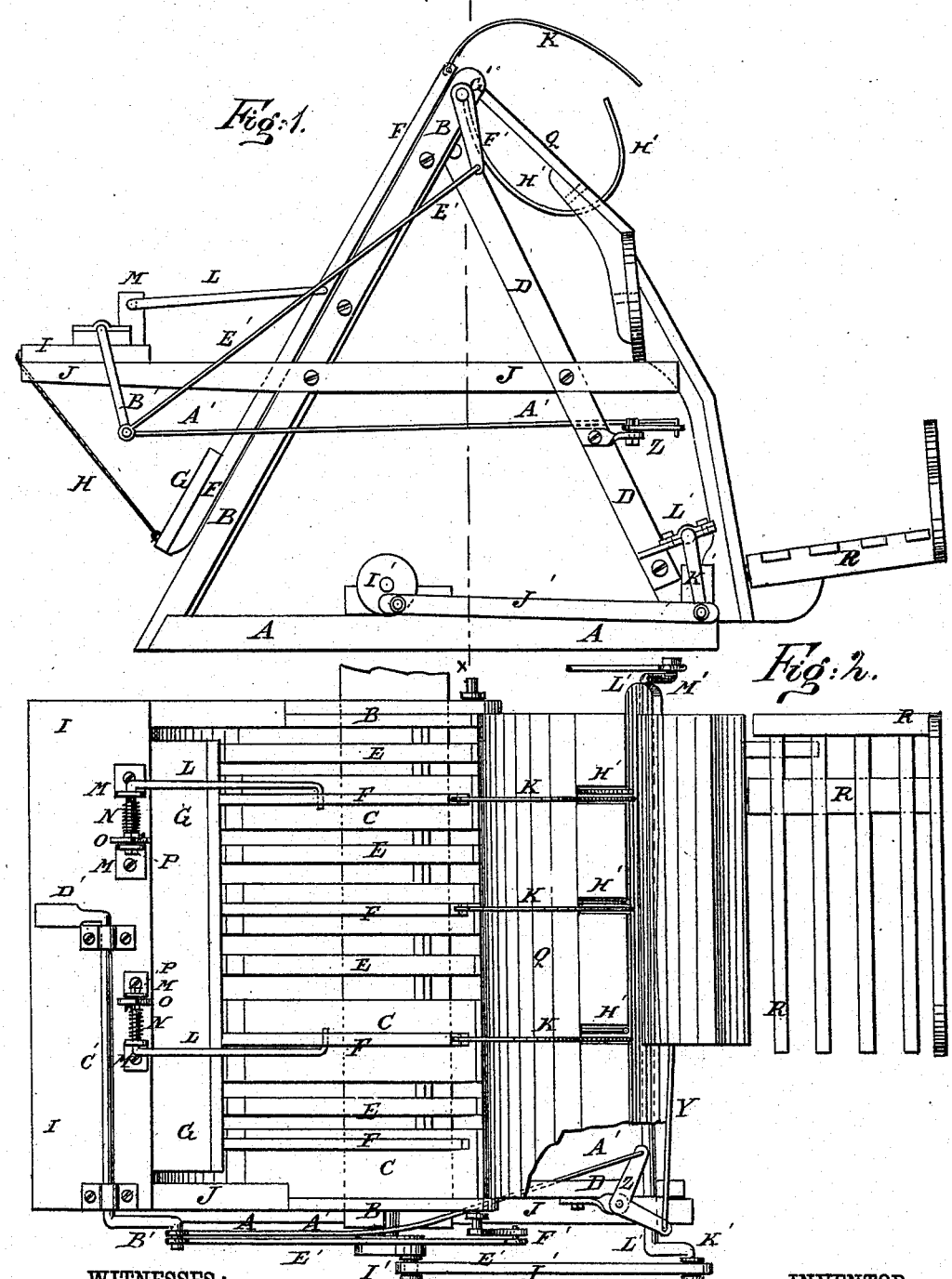

W. GANGWER.
Harvester.

No. 203,609. Patented May 14, 1878.

WITNESSES:
Jneas Nida
O. Sedgwick

INVENTOR:
W. Gangwer
BY Munn & Co
ATTORNEYS.

UNITED STATES PATENT OFFICE.

WILLIAM GANGWER, OF MULBERRY, INDIANA.

IMPROVEMENT IN HARVESTERS.

Specification forming part of Letters Patent No. 203,609, dated May 14, 1878; application filed December 26, 1877.

*To all whom it may concern:*

Figure 3:
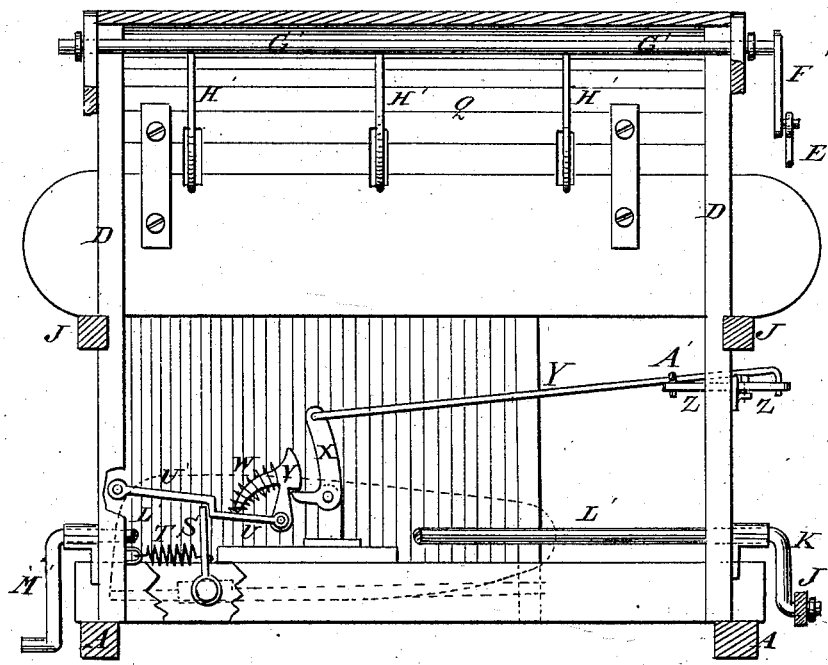
Figure 4:
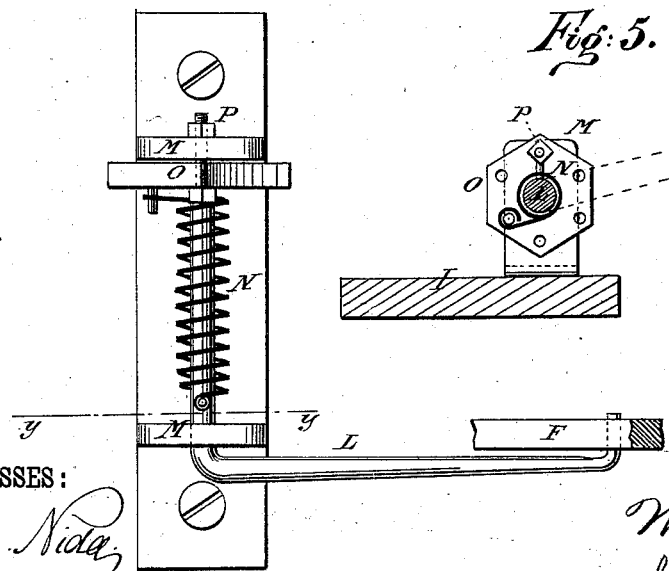
Figure 5:
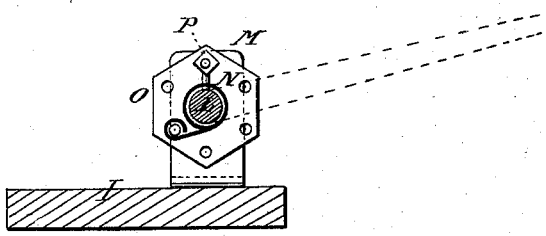

Be it known that I, WILLIAM GANGWER, of Mulberry, in the county of Clinton and State of Indiana, have invented a new and useful Improvement in Harvesters, of which the following is a specification:

Figure 1, Sheet 1, is a rear view of a part of a harvester to which my improvements have been applied. Fig. 2, Sheet 1, is a top view of the same, part being broken away to show the construction. Fig. 3, Sheet 2, is a vertical section of the same, taken through the line $x\ x$, Fig. 1. Fig. 4, Sheet 2, is a detail view of the adjustable spring-elbow. Fig. 5, Sheet 2, is a detail section of the same, taken through the line $y\ y$, Fig. 4.

Similar letters of reference indicate corresponding parts.

The object of this invention is to improve the construction of the harvester for which Letters Patent were granted to me November 14, 1876, and numbered 184,365, so as to make it simpler in construction and more convenient in use, and so that the gavels may be dropped to the ground out of the way of the machine in its next round.

The invention will first be described in connection with the drawing, and then pointed out in the claim.

A represents a part of the harvester-frame, to which is attached the inclined frame B, that supports the inclined platform C. The frame B and platform C are supported by the inclined bars D, and the grain is carried up them by the elevator.

The grain is kept in place while being carried up the inclined platform C by the bars F, the lower ends of which are attached to a board, G, and which are kept in place by the weight of the said board.

The bars F and the board G are kept from dropping down too far by the cords H, the lower ends of which are attached to the said board G, and their upper ends are attached to the platform I.

The platform I is designed to receive the driver's seat, and is attached to the projecting ends of two bars, J, which are attached to the side bars of the inclined frame B and the inclined bars D.

To the upper ends of the bars F are jointed curved fingers K, to keep the grain in place while passing over the top of the inclined platform C.

To two or more of the guard-bars F are hinged the ends of rods L, the other ends of which are bent at right angles and pass through lugs M, attached to the platform I.

Around the bent arms of the rods L are coiled spiral springs N, one end of each of which is attached to each of said arms. The other ends of the said springs are attached to small polygonal plates O, through the centers of which the bent arms of the rods L pass, and which have a circle of holes formed through them near their edge to receive the bolts P, by which they are secured to the lugs M, so that, by applying a wrench to the plates O and removing the bolts P, the said plates O may be turned to regulate the tension of the springs N, so that the bars F may be held down upon the grain passing up the inclined platform C with any desired pressure.

From the upper edge of the inclined platform C the grain slides down the inclined board or apron Q and falls into the receiver R, which is made with an open rear end, and is pivoted near its rear end to the frame A.

To the pivot of the receiver R is rigidly attached an upwardly-projecting arm, S, to which is attached the end of a spiral spring, T. The other end of the spring T is attached to the frame of the machine.

The spring T is made sufficiently strong to raise the receiver R into a horizontal position when it has been tilted by the weight of the gavel and the said gavel has slipped from it.

The receiver R is locked in place while receiving the grain by the lever U, one end of which is pivoted to the frame-work of the machine, and which has a shoulder formed upon it for the end of the arm S to rest against.

To the free end of the lever U is pivoted a catch, V, which is held forward by the spiral spring W interposed between its upper end and the said lever U.

The spring W is kept in place by being coiled around a curved arm formed upon the catch V, and which passes through a guide-hole in the lever U.

The shoulder of the catch V rests upon the short arm of a bent lever, X, which is pivoted at its angle to the frame-work of the machine, and the end of the long arm of which is pivoted to the end of a connecting-rod, Y.

The rear end of the connecting-rod Y is pivoted to an arm of the bent lever Z, which is pivoted at its angle to the rear bar D. To the other arm of the bent lever Z is pivoted the end of the connecting-rod A'. The other end of the connecting-rod A' is pivoted to a crank, B', formed upon the outer end of the shaft C', which works in bearings attached to the platform I.

Upon the inner end of the shaft C' is formed, or to it is attached, a crank, D', which projects in such a direction that it may be readily operated by the driver with his foot to raise the lever U and allow the receiver to tilt, so that the gavel may slide off. To the crank B' is also pivoted the end of the connecting-rod E', the other end of which is pivoted to a crank, F', formed upon or attached to the end of the rod G'.

The rod G' works in bearings attached to the upper end of the frame B, and to it are rigidly attached a number of curved fingers, H', which, as the rod G' is rocked, are projected through short slots in the inclined apron Q, to receive the cut grain while the receiver R is being tilted, and detain it until the said receiver R has been again raised into place.

I' is the crank-wheel, which is driven in the usual way, and to which is pivoted the end of a connecting-rod, J', the other end of which is pivoted to a crank, K', formed upon or attached to the rear end of the shaft L'.

The crank K' is made longer than the radius of the crank-wheel I', so that a revolution of the said crank-wheel I' will only rock the shaft L'.

The shaft L' works in bearings attached to the frame of the machine, and to its forward end is attached, or upon it is formed, a crank, M', to receive the pitman that drives the sickle-bar.

This construction allows the driving mechanism to be placed upon the rear part of the machine, so as to be out of the way, and at the same time conveniently accessible when required.

Having thus described my invention, I claim as new and desire to secure by Letters Patent—

The combination, with the receiver having arm S and spring T, of the shouldered perforated lever U, the catch V, having curved arm with spring, the bent lever X, and operative mechanism, substantially as shown and described, for the purpose specified

WILLIAM GANGWER.

Witnesses:
DAVID NUNEMACHER,
EPHREAIM RATHENBERGER.